United States Patent [19]

Yasuda

[11] Patent Number: 5,603,100
[45] Date of Patent: Feb. 11, 1997

[54] PORTABLE TELEPHONE WITH SPEAKER PROJECTED IN FRONT UPPER OBLIQUE DIRECTION

[75] Inventor: Hiroshi Yasuda, Kanagawa, Japan

[73] Assignee: Sony Corporation, Tokyo, Japan

[21] Appl. No.: 326,936

[22] Filed: Oct. 21, 1994

[30] Foreign Application Priority Data

Oct. 29, 1993 [JP] Japan .................................. 5-272794

[51] Int. Cl.⁶ .................................................. H04B 1/38
[52] U.S. Cl. ........................... 455/89; 455/90; 379/433
[58] Field of Search .................... 455/89, 90, 129, 455/348, 351; 379/433, 440; 343/702; 361/814, 825; 403/84, 86

[56] References Cited

U.S. PATENT DOCUMENTS

| | | | |
|---|---|---|---|
| 5,109,539 | 4/1992 | Inubushi et al. | 455/89 |
| 5,151,946 | 9/1992 | Martensson et al. | 379/433 |
| 5,369,788 | 11/1994 | Nagai | 455/90 |
| 5,404,390 | 4/1995 | Tamura | 379/433 |
| 5,450,619 | 9/1995 | Maeda | 455/89 |
| 5,461,672 | 10/1995 | Enokido et al. | 379/433 |

FOREIGN PATENT DOCUMENTS

| | | |
|---|---|---|
| 0535903 | 4/1993 | European Pat. Off. . |
| 0580334 | 1/1994 | European Pat. Off. . |
| 0590671 | 4/1994 | European Pat. Off. . |
| 3401518 | 7/1985 | Germany . |
| 0056524 | 3/1986 | Japan .................................. 455/89 |
| 0038149 | 2/1991 | Japan .................................. 379/433 |
| 0175826 | 7/1991 | Japan .................................. 455/89 |
| 6085730 | 3/1994 | Japan .................................. 455/89 |
| 2235850 | 3/1991 | United Kingdom . |

*Primary Examiner*—Andrew Faile
*Attorney, Agent, or Firm*—Jay H. Maioli

[57] ABSTRACT

A portable telephone includes a telephone body, a receiver unit, a receiver supporting mechanism and a display unit. The telephone body includes a transmitter attached to one end thereof and an antenna attached to the other end thereof. The telephone body includes at least one aperture defined on one front surface thereof so as to communicate with the transmitter. The receiver unit is placed on the other end of said telephone body. The supporting mechanism slidably supports the receiver such that the receiver is projected from the telephone body not only in the direction away from the antenna but also with a predetermined angle with respect to the longitudinal direction of the telephone body. The display unit is placed on the front surface of the telephone body. A part of the display unit is covered with the receiver unit when the portable telephone is in a telephone call standby mode.

11 Claims, 8 Drawing Sheets

PORTABLE TELEPHONE WITH SPEAKER PROJECTED IN FRONT UPPER OBLIQUE DIRECTION

BACKGROUND

1. Field of the Invention

The present invention relates to portable telephones and, particularly to a portable telephone having a movable portion.

2. Background of the Invention

A wide variety of radio communication system devices have hitherto been proposed to make a mobile communication. Radio communication system devices, such as mobile telephones, personal radio transceivers and portable telephones, in particular, of a stationary type, a shoulder type or a handheld type are now commercially available on the market.

FIG. 1 shows an example of a portable telephone that is now in general use. While personal transceivers make a communication by using the 90 MHz band, mobile telephones and portable telephones make a communication by using the 800 MHz band making antennas of the mobile telephone and the portable telephone relatively short in length.

In FIG. 1, reference numeral 1 generally depicts a portable telephone which is of a handheld type cordless telephone. As shown in FIG. 1, this portable telephone 1 includes an outer casing 2 of a rectangular box configuration made of synthetic resin. The outer casing 2 includes a front panel 2a, and the front panel 2a has a receiver or speaker 3 provided on its upper end face so as to be housed in the outer casing 2. The telephone 1 also includes an operation key group 4 disposed at its substantially central position. The operation key group 4 includes a plurality of operation keys, such as ten keys or the like. The telephone 1 includes a transmitter (microphone) 5 provided on its lower surface side so as to be housed in the outer casing 2.

The telephone 1 includes an antenna 6 upwardly extended from the upper surface portion of the outer casing 2. Some portable telephones include a liquid crystal display (LCD) unit provided on the front panel 2a of the outer casing 2 in order to display information entered by the user, though not shown.

The portable telephone 1 thus arranged includes the receiver 3 and the transmitter 5 both of which are housed within the outer casing 2. Therefore, the outer casing 2 has to be long enough to the extent that it can substantially cover the length between the user's ears and mouth. As a result, the whole portable telephone 1 becomes too large in size to be put into user's suitable carrying means, such as a purse or the like.

To solve the above-mentioned problem, proposed is a portable telephone which includes a telephone body composed of two telephone body portions joined by a hinge. These two telephone body portions are rotated to open when this portable telephone is in use.

Furthermore, there is commercially available a portable telephone having a miniaturized telephone body, i.e., a short-length outer casing. When this portable telephone is in use, a part of the outer casing can be slid upwardly along the longitudinal direction of the outer casing such that the length between the receiver and the transmitter housed in the lower portion of the outer casing can substantially cover the length between the user's ears and mouth.

However, as the outer casing of the telephone body is reduced in length, it is unavoidable that the antenna that is provided on the telephone body is placed closer to the user's body when the portable telephone is in use. When a telephone call is made, if the antenna of the portable telephone is placed too close to the user's body, then interference is exerted upon a radio radiation characteristic and a telephone call is disturbed by noise accordingly.

SUMMARY OF THE INVENTION

It is, therefore, an object of the present invention to provide a portable telephone in which the above-mentioned problems can be solved.

According to the present invention, provided is a portable telephone which includes a telephone body, a receiver and a supporting mechanism. The telephone body includes a transmitter and an antenna attached thereto. The supporting mechanism includes the receiver attached thereto and supports the receiver such that the receiver can be projected from the telephone body.

According to the present invention, provided is a portable telephone which includes a telephone body, a receiver and a supporting mechanism. The telephone body includes a transmitter attached to one end thereof and an antenna attached to the other end thereof. The receiver is disposed on the antenna side of the telephone body. The supporting mechanism includes the receiver attached thereto and supports the receiver such that the receiver is projected from the telephone body not only in the direction away from the antenna but also with a predetermined angle with respect to the longitudinal direction of the telephone body.

According to the present invention, provided is a portable telephone which includes a telephone body, a receiver unit, a supporting mechanism and a display unit. The telephone body includes a transmitter attached to one end thereof and an antenna attached to the other end thereof. The telephone body has at least one aperture defined on one side surface thereof so as to communicate with the transmitter. The receiver unit includes a receiver attached thereto and is provided on the other end side of the telephone body. The supporting mechanism supports the receiver of the receiver unit such that the receiver is projected from the telephone body not only in the direction away from the antenna but also with a predetermined angle with respect to the longitudinal direction of the telephone body. The display unit is placed on one side of the telephone body. At least a part of the display unit is covered with the receiver unit when the portable telephone is in the telephone call standby mode.

According to the present invention, since the receiver portion is projected from the telephone body when a telephone call is made, the user can reliably contact the receiver portion with the auricle when the user puts the mouth close to the transmitter of the telephone body. Thus, it is possible to improve an acoustic characteristic. Further, since the receiver unit is projected away from the telephone body, the antenna of the telephone becomes distant from the user's body. Thus, it is possible to improve a radio radiation characteristic. Therefore, the user can make an improved telephone communication.

BRIEF DESCRIPTION OF THE DRAWINGS

FIGS. 10A and 10B are front views each showing the arrangement of the portable telephone according to the second embodiment, wherein FIG. 10A shows the portable telephone according to the second embodiment in the telephone call standby mode, and FIG. 10B shows the portable telephone according to the second embodiment energized when a telephone call is made.

DESCRIPTION OF THE INVENTION

A portable telephone according to the present invention will be described in detail below with reference to the drawings.

Figure 1:
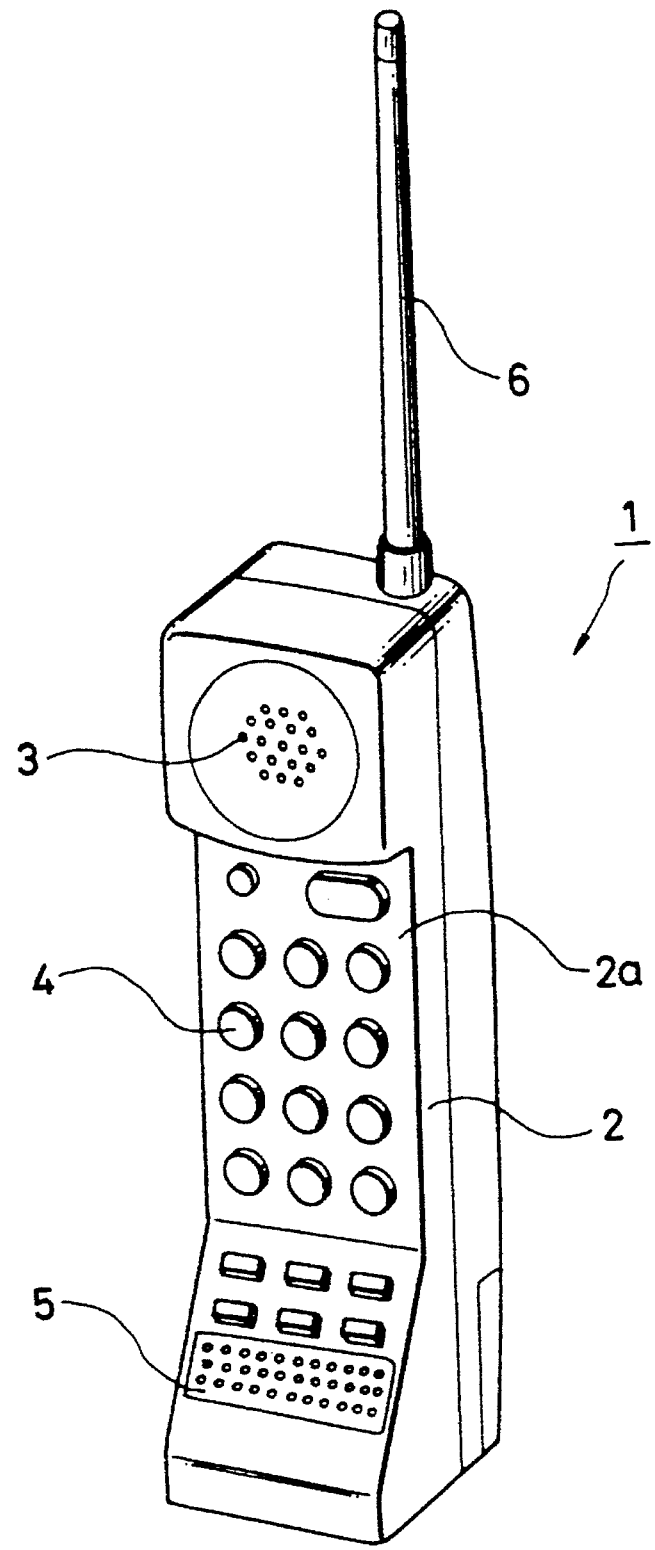
FIG. 1 is a perspective view showing an outer face of a commercially available portable telephone.
Figure 2:
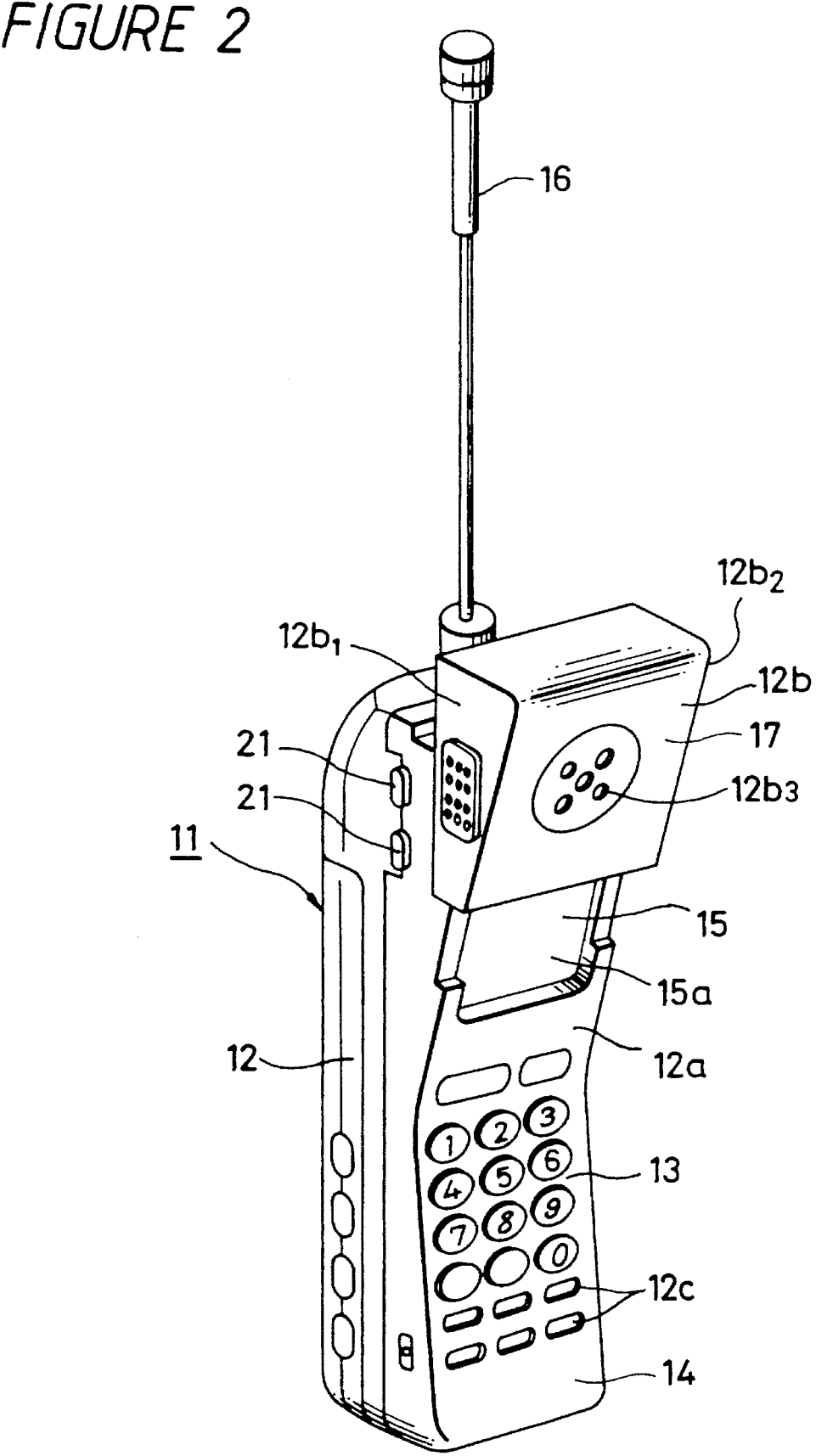
FIG. 2 is a perspective view of an outer face of the portable telephone according to the first embodiment of the present invention and illustrating the state that the portable telephone is in use when a telephone call is made.
Figure 3:
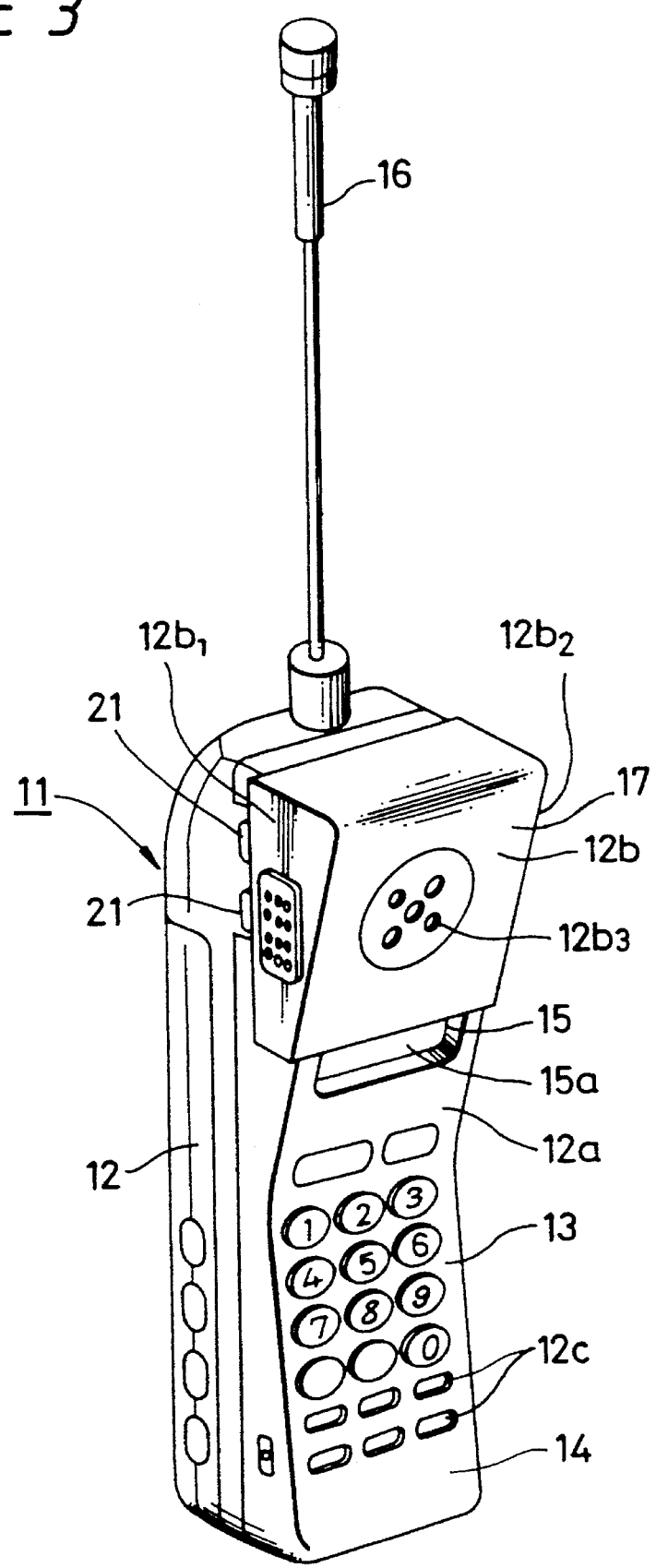
FIG. 3 is a perspective view of an outer face of the portable telephone according to the first embodiment of the present invention and illustrating the state that the portable telephone is in the telephone call standby mode.

Referring initially to FIGS. 2 through 8, a first embodiment of the present invention will be described. As shown in FIGS. 2 and 3, the portable telephone according to this embodiment includes a telephone body 11. The telephone body 11 includes an outer casing 12 of a rectangular box configuration having a front panel 12a. The front panel 12a is curved in a substantially L-letter fashion as seen from the side.

The front panel 12a includes a plurality of operation keys 13, such as ten keys or the like, disposed on its lower half portion. The front panel 12a includes a transmitter (microphone) 14 disposed on its lower surface side so as to be housed within the outer casing 12. The front panel 12a includes a display unit 15 formed of a liquid crystal display (LCD) device disposed on its upper half portion near the center. The display unit 15 can display information or the like entered when the user operates the operation keys 13. The portable telephone has an antenna 16 upwardly extended from the upper surface portion of the outer casing 12.

The front panel 12a includes a plurality of apertures 12c defined on its lower end at the position corresponding to the position at which the transmitter 14 is housed. User's voice is introduced into the transmitter 14 through the apertures 12c.

The outer casing 12 includes the front panel 12a and the front panel 12a includes a sub-panel 12b supported to its upper surface side of the upper half portion by a supporting mechanism, which will be described later on, such that the sub-panel 12b can be moved in the front upper oblique direction. The sub-panel 12b includes a receiver 17 attached to its inner surface side. The sub-panel 12b includes a plurality of apertures 12b3 defined at its position corresponding to the position at which the receiver 17 is housed. User's voice emanated from the receiver 17 is output to the outside through the apertures 12b3.

Figure 4:
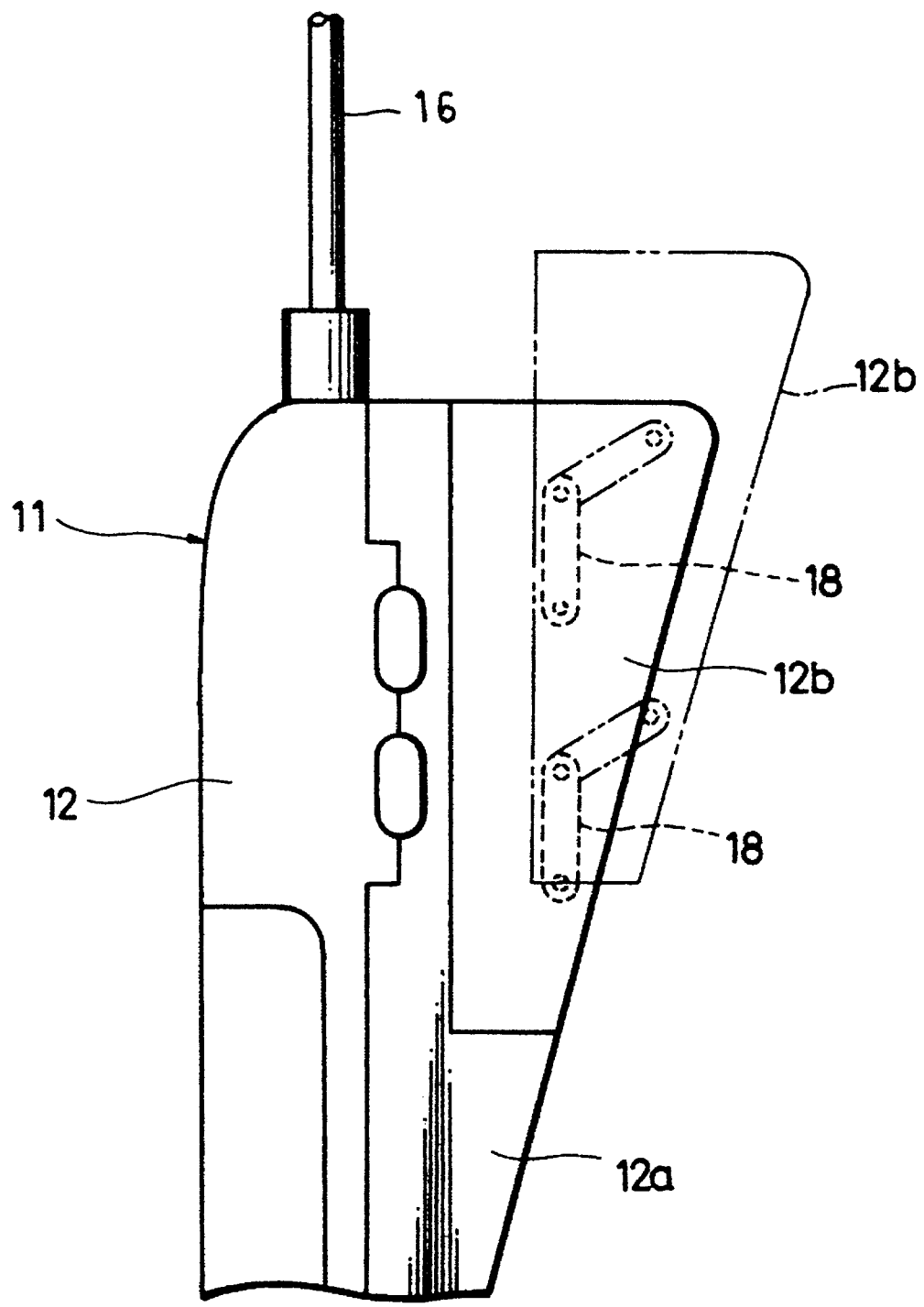
FIG. 4 is a side view showing the extended receiver unit of the portable telephone in an enlarged scale.
Figure 5:
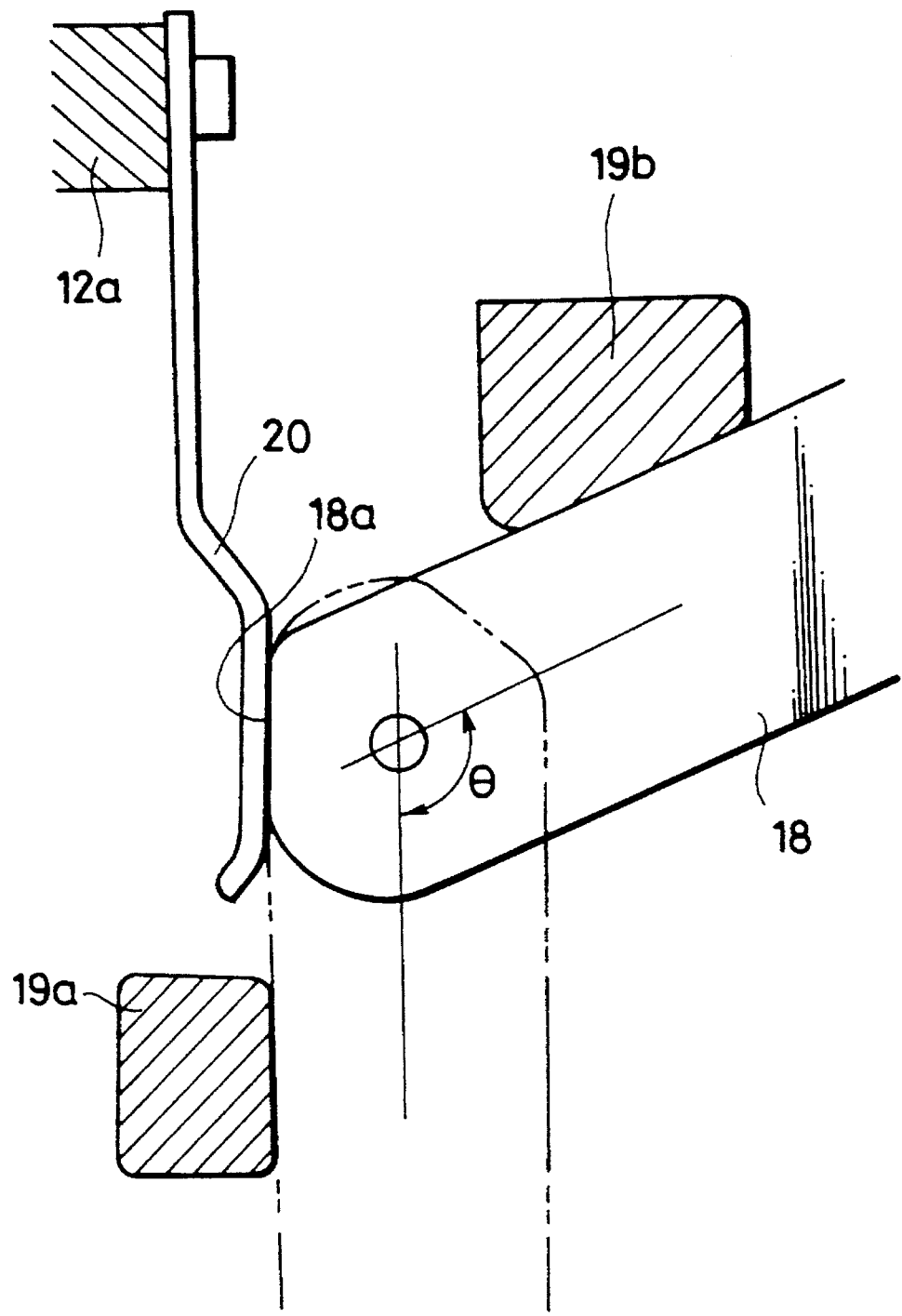
FIG. 5 is a diagram showing an arrangement of a supporting mechanism of the portable telephone.

A supporting mechanism that supports the sub-panel 12b to the front panel 12a is composed of a pair of rotating arms 18 as shown in FIGS. 4 and 5.

Specifically, the front panel 12a includes a pair of upper and lower rotating arms 18 attached to the upper portion of the respective side surfaces of its upper half portion such that the rotating arms 18 can be freely rotated at one of their ends. The other ends of the rotating arms 18 are attached to the sub-panel 12b at its respective side surface portions 12b1, 12b2 inwardly facing the respective side surfaces of the front panel 12a. Thus, as shown by a two-dot chain line in FIG. 4, the sub-panel 12b is moved by the rotating arms 18 in parallel to the front panel 12a and the sub-panel 12b can be projected in the front upper oblique direction of the front panel 12a.

As shown in FIG. 5, the sub-panel 12b is permitted to move in a range defined when the rotating arms 18 abut against first and second engagement portions 19a, 19b formed on the side surfaces of the front panel 12a.

Specifically, the rotating arm 18 abuts against the first engagement portion 19a and is engaged with the first engagement portion 19a in alignment with the longitudinal direction of the front panel 12a at the position in which the sub-panel 12b overlaps the front panel 12a. The rotating arm 18 abuts against the second engagement portion 19b and is engaged with the second engagement portion 19b at the position in which the sub-panel 12b is projected in the front upper oblique direction of the front panel 12a.

The rotating arms 18 can be rotated in the range defined when they are engaged with the first and second engagement portions 19a, 19b as described above. According to the first embodiment of the present invention, a rotational angle θ is defined when the rotating arm 18 is engaged with the second engagement portion 19b after the rotating arm 18 was engaged with the first engagement portion 19a. θ is set to an obtuse angle as shown by a two-dot chain line in FIG. 5. Under the condition that the rotating arms 18 are engaged with the first and second engagement portions 19a, 19b, the rotating arms 18 are supported under spring force of pressing spring member, such as a leaf spring 20.

It is possible to support the rotating arms 18 under spring force of the pressing spring member 20 by pressing the rotating arms 18 at their portions in which the rotating arms 18 are pivotally supported to the front panel 12a in the support shaft direction. When the rotating arm 18 is in engagement with the first engagement portion 19a, the pressing spring member 20 abuts against the side edge of the arm attachment end portion. When the rotating arm 18 is in engagement with the second engagement portion 19b, the pressing spring member 20 abuts against a cam surface 18a formed on the circumferential surface of the attachment end portion of the rotating arm 18 to thereby press the rotating arm 18. Thus, the rotating arm 18 is engaged between the first and second engagement portions 19a and 19b in a click fashion. The sub-panel 12b is held between the position at which the sub-panel 12b overlaps the front panel 12a, i.e., retracted position and the projected position, i.e., the position at which the portable telephone is in use.

Figure 6:
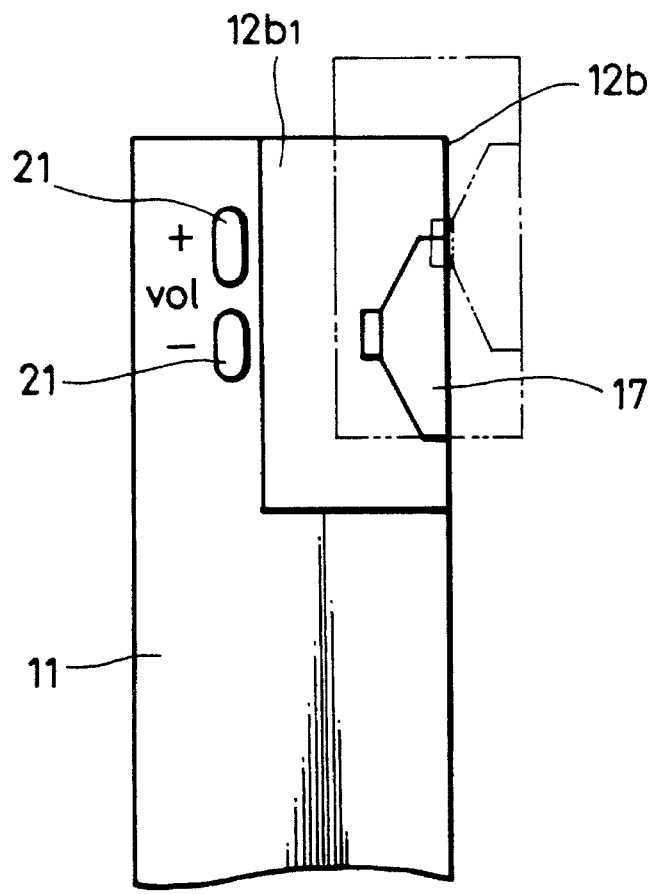
FIG. 6 is a side view showing a part of the portable telephone in an enlarged scale.
Figure 7:
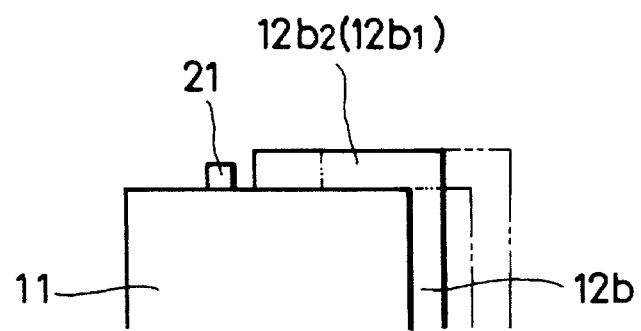
FIG. 7 is a plan view of the portion shown in FIG. 6.

According to the first embodiment of the present invention, the sub-panel 12b is composed of the side surface portions 12b1, 12b2 which are located outside the side surfaces of the front panel 12a. As shown in FIG. 7, a thickness of each of the side surface portions 12b1 or 12b2 is selected to be nearly equal to or somewhat greater than a height obtained when an operation button 21, such as a volume button disposed on the side surface of the outer casing 12, is projected from the side surface of the front panel 12a. As shown in FIGS. 6 and 7, under the condition that the sub-panel 12b is placed at the retracted position so that the side surface portions 12b1, 12b2 are close to the operation button 21, the operation button 21 is located in the range in which the side surface portions 12b1, 12b2 are larger in thickness. As a consequence, the operation button 21 becomes difficult to handle. If the sub-panel 12b is projected relative to the front panel 12a and located at the position in which the portable telephone can be used, then it becomes possible to handle the operation button 21 normally.

Further, as shown in FIGS. 2 and 3 according to the first embodiment of the present invention, the sub-panel 12b can cover the display unit 15 disposed on the front panel 12a so as to leave a predetermined display portion 15a exposed when the sub-panel 12b is placed at the retracted position relative to the front panel 12a. The display unit 15 constantly displays necessary items of information on its display portion 15a that is not covered with the sub-panel 12b.

Operation of the portable telephone according to the first embodiment of the present invention will be described below.

When the portable telephone is not in use (telephone call is not made), the sub-panel 12b having the receiver 17 is overlapped on the upper half portion of the front panel 12a and placed at the retracted position. Thus, the portable telephone is reduced in length on the whole and looks compact.

When the portable telephone is in use (telephone call is made), the sub-panel 12b is pushed relative to the front panel 12a so as to project in the front upper direction through the rotating arms 18. At that time, the rotating arm 18 is pressed against the second engagement portion 19b.

Figure 8:
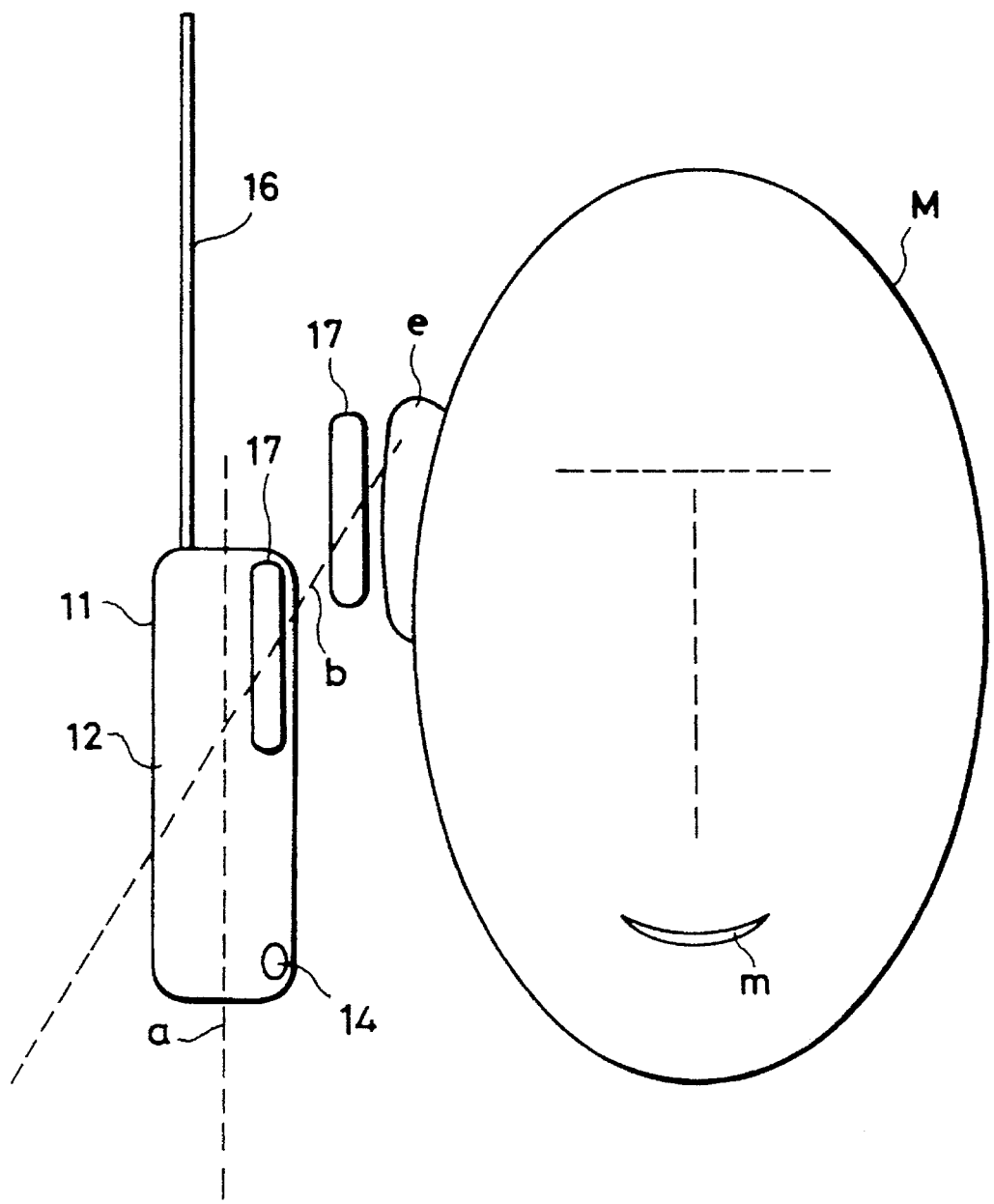
FIG. 8 is a schematic diagram used to explain the portable telephone according to the first embodiment in use.

Consequently, as shown in FIG. 8, the receiver 17 is moved upwardly along a line b inclined by a predetermined angle θ from a line a of the longitudinal direction of the telephone body 11.

Thus, when a telephone call is made, the user contacts the receiver 17 with an auricle e under the condition that the user keeps the transmitter 14 housed in the telephone body 11, i.e., lower portion of the outer casing 12 close to user's mouth m of a human body M. More precisely, the user can move the receiver 17 to the position opposing the auricle e when the sub-panel 12b is brought in contact with the auricle e. Thus, the user can make a very good telephone call with an improved acoustic characteristic. In this condition, because the antenna 16 upwardly extended from the upper surface portion of the outer casing 12 is made distant from the human body M, it is possible to improve a radio radiation characteristic. Thus, the user can make a very good telephone call.

When the receiver 17, i.e., the sub-panel 12b is strongly pressed against the auricle e, the rotating arm 18 is rotated by the predetermined obtuse angle θ and abuts against the second engagement portion 19b, whereby the receiver 17 can stably be brought in close contact with the auricle e. Therefore, the receiver 17 can be prevented from returning to the original position inadvertently.

In the first embodiment according to the present invention, when the portable telephone is not in use (telephone call is not made), the display unit 15a on the front panel 12a is covered with the sub-panel 12b except the display portion 15a on which displayed items are constantly displayed. As a consequence, the user can know clearly that the receiver 17 is not placed at the telephone call position and that a telephone call will be inhibited from being made. Thus, it is possible to prevent the user from operating the portable telephone wrongly.

Under the condition that the sub-panel 12b is placed at the retracted position when the portable telephone is not in use, the operation button 21 becomes difficult to handle. Therefore, it is possible for the user to confirm the disabled state of the portable telephone from a visual standpoint and also from a standpoint of touch. Thus, the user can be prevented from operating the portable telephone wrongly and the user can gain a better understanding of how to operate the portable telephone with ease.

If the operation button 21 is used as a volume button to control a volume of an alert sound representing an incoming call, this embodiment will prevent the volume button from being depressed inadvertently.

While the sub-panel 12b with the receiver 17 attached thereto can move the receiver 17 and also prevent the user from operating the portable telephone wrongly as described above in the first embodiment, the present invention is not limited thereto and the sub-panel 12b may not prevent the user from operating the portable telephone wrongly but can move the receiver.

While the supporting mechanism for supporting the sub-panel 12b, i.e., the moving mechanism of the receiver 17 is composed of the rotating arms 18 as described above, the present invention is not limited thereto. Other methods of sliding the sub-panel 12b like along a guide groove defined between the telephone body 11 and an attachment member to which the receiver 17 is attached, such as the sub-panel 12b or a method of sliding the sub-panel 12b in a click fashion would be apparent to someone skilled in the art.

Figure 10B:
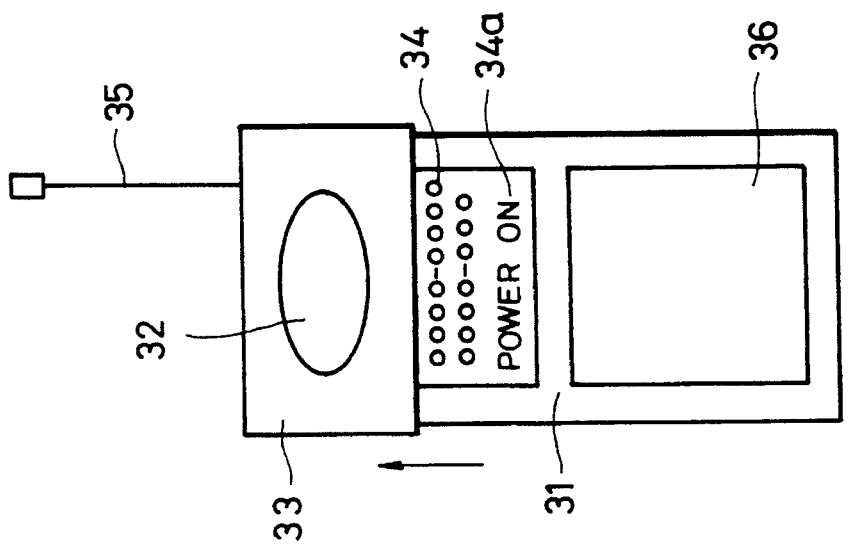
Figure 9:
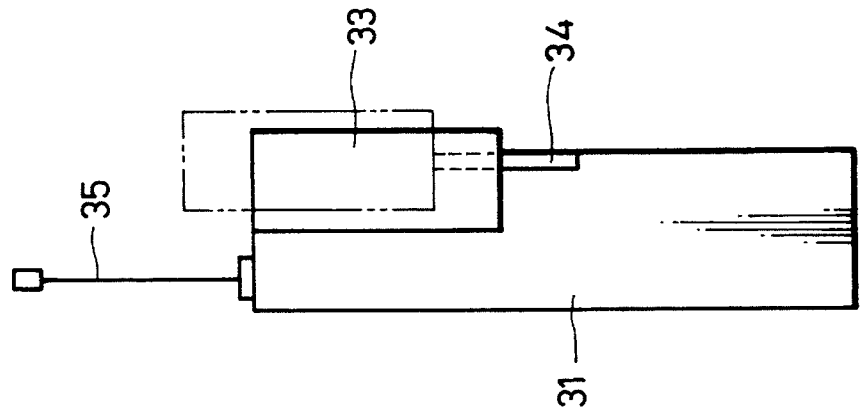
FIG. 9 is a side view showing an arrangement of a portable telephone according to a second embodiment of the present invention.

The portable telephone according to a second embodiment of the present invention will be described with reference to FIGS. 9, 10A and 10B. As illustrated, a front panel of a telephone body 31 is planar unlike that of the telephone body 11 according to the first embodiment. The telephone body 31 includes a display unit 34 formed of a liquid crystal display device or the like provided on the upper portion of the center of its front panel. Though not shown, the telephone body 31 includes a transmitter disposed on the inside of its lower portion. The telephone body 31 includes an operation unit 36 formed of a plurality of keys (not shown) disposed between the display unit 34 formed on its front panel and the transmitter. The telephone body 31 includes a sub-panel 33 attached to its upper side portion so as to become movable in the upper and lower direction. The sub-panel 33 includes a receiver 32 attached to its inner surface. As shown in FIG. 9, the sub-panel 33 is supported by a supporting mechanism (not shown) such that, when the portable telephone is in use or a telephone call is made, the sub-panel 33 is projected from the front panel of the telephone body 31 in the forward direction and that the sub-panel 33 is projected from the upper end of the telephone body 31. When the portable telephone is not in use or the portable telephone is in the telephone call standby mode, the sub-panel 33 is accommodated in the telephone body 31 such that it is substantially flush with the front panel and the upper end of the telephone body 31. The portable telephone includes an antenna 35 upwardly projected from the upper end of its telephone body 31.

Figure 10A:
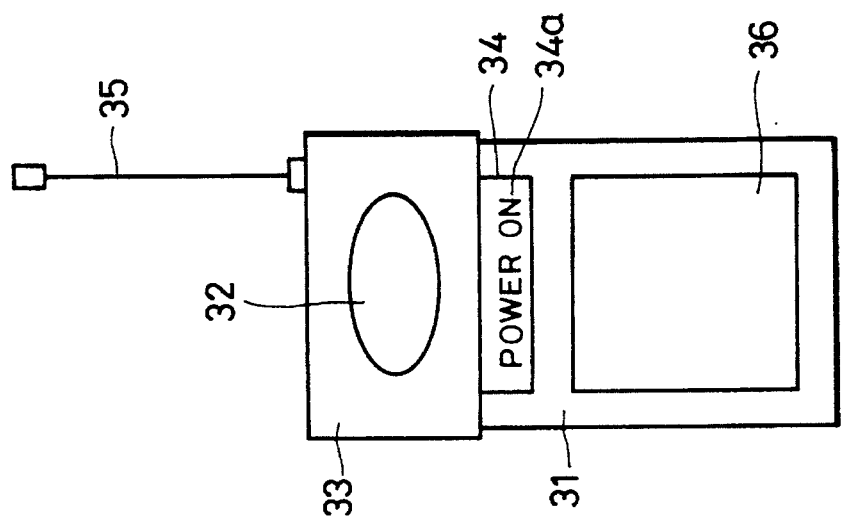

As shown in FIG. 10A, when the portable telephone is in the telephone call standby mode, the display unit 34 is covered with the sub-panel 33 except a part thereof (referred to hereinafter as "normal display portion 34a"). The normal display portion 34a displays time and information representing telephone operation condition, such as POWER ON or the like. As shown in FIG. 10B, in the normal state, the sub-panel 33 is projected from the telephone body 31 as described above so that the whole of the display unit 34 is exposed and can be visually observed from the outside. In this state, the display unit 34 displays received data and information entered by the operation unit 36 or the like. According to the second embodiment, although the receiver 33 is projected from the telephone body 31 by a small amount as compared with the first embodiment because the front panel of the telephone body 31 is made flat as compared with the first embodiment, in the state shown in FIG. 10B, the receiver 33 is moved up to the position shown by a two-dot chain line in FIG. 9 so that the antenna 35 can be made distant from the user's body similarly to FIG. 8. According to the second embodiment, the thickness of the telephone body 31 can be reduced as compared with the first embodiment. Further, as shown in FIG. 10A, under the condition that a part of the display unit 34 is covered with the receiver 33 when the telephone is placed in the telephone call standby mode, the user can visually observe that the operation unit 36 cannot be operated. Thus, the user can be prevented from operating the telephone wrongly.

The telephone body can be arbitrarily changed in arrangement and structure and the supporting member, such as the panel having the receiver attached thereto, can also be changed in arrangement and shape in association therewith.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A portable telephone comprising:

a telephone body having an upper portion and a lower portion;

a microphone attached to said lower portion of said telephone body;

an antenna attached to said upper portion of said telephone body;

a speaker; and a supporting mechanism mounted on said upper portion of said telephone body, for supporting said speaker attached thereto at a first position and a second position relative to said telephone body, said speaker being movable between said first position and said second position, movement of said speaker from said first position to said second position following a linear path and resulting in the speaker being in a front upper oblique direction relative to said telephone body, wherein at said second position said speaker is projected from said telephone body and wherein said supporting mechanism includes an arm pivotally attached to a side of said telephone body and said speaker is projected from said telephone body by pivoting said arm to an obtuse angle relative to a front surface of said telephone body.

2. A portable telephone according to claim 1, wherein said telephone body has a recess formed in said front surface thereof and at said first position said speaker is accommodated in said recess in said telephone body and at said second position said speaker is forwardly projected from said front surface of said telephone body and positioned above said recess formed in said telephone body.

3. A portable telephone according to claim 1, wherein said telephone body includes a plurality of operation buttons disposed on said front surface thereof and at least one aperture formed in said front surface to facilitate communication through said microphone, said speaker being attached to said front surface of said telephone body by said supporting mechanism.

4. A portable telephone according to claim 1, wherein said telephone body includes a recess formed in said front surface thereof and further comprising a display unit disposed in said recess so that a part of said display unit is covered by said speaker when said portable telephone is at said first position in a telephone call standby mode.

5. A portable telephone according to claim 1, wherein said telephone body includes at least one operation button projected from said side of said telephone body, and said speaker includes an attachment member to which said supporting mechanism is attached, and a thickness of said attachment member is greater than a height of said operation button projecting above said side surface of said telephone body.

6. A portable telephone comprising:

a telephone body having a front surface;

a microphone attached to one end of said telephone body;

an antenna attached to an other end of said telephone body, said one end and said other end defining a length of said telephone body;

a speaker located at said one end of said telephone body; and supporting means mounted on said telephone body, for supporting said speaker attached thereto at a first position and a second position relative to said telephone body, said speaker being moveable from said first position to said second position by following a linear path and resulting in the speaker being in a front upper oblique direction away from said antenna and said front surface so that a distance between said speaker and said microphone is increased and a predetermined angle is formed with respect to said length of said telephone body, wherein said supporting means includes at least a pair of arms pivotally attached to a side of said telephone body and to said speaker and said pair of arms are pivoted to an obtuse angle relative to said front surface of said telephone body when said speaker is moved to said second position.

7. A portable telephone according to claim 6, wherein said telephone body includes a recess formed in said front surface thereof and further comprising a display unit disposed in said recess so that at least a part of said display unit is covered with said speaker when said speaker is at said first position.

8. A portable telephone according to claim 6, wherein said telephone body includes a plurality of operation buttons disposed on a central portion of said front surface thereof and at least one aperture formed in said front surface so as to communicate with said microphone, said speaker being attached to said front surface of said telephone body by said supporting means.

9. A portable telephone according to claim 8, wherein said telephone body includes a recess formed in said front surface thereof and further comprising a display unit disposed in said recess so that part of said display unit is covered by said speaker when said portable telephone is in a telephone call standby mode.

10. A portable telephone comprising:

a microphone;

a telephone body having a front surface, a bottom end and a top end, said microphone being attached to said bottom end of said telephone body, said telephone body having at least one aperture formed on said front surface to facilitate communication through said microphone;

an antenna attached to said top end of said telephone body;

a speaker located at said top end of said telephone body;

supporting means mounted no said telephone body for supporting said speaker in a first position and a second position relative to said telephone body, said speaker being moveable from said first position to said second position by following a linear path and resulting in the speaker being in a front upper oblique direction away from said antenna and said front surface of said telephone body; and a display unit disposed on a recess formed in said front surface of said telephone body so that at least a part of said display unit is covered with said speaker when said portable telephone is in a telephone call standby mode;

wherein said supporting means includes an arm pivotally attached to a side of said telephone body and to said speaker and said speaker is projected from said telephone body by pivoting said arm to an obtuse angle relative to said front surface of said telephone body.

11. A portable telephone accord to claim 10, wherein a length defined by said top end and said bottom end is increased when said speaker is moved to said second position.

* * * * *